United States Patent
Fukui

(10) Patent No.: US 7,805,549 B2
(45) Date of Patent: Sep. 28, 2010

(54) TRANSFER APPARATUS AND METHOD

(75) Inventor: Akitomo Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 11/806,101

(22) Filed: May 30, 2007

(65) Prior Publication Data
US 2008/0005444 A1    Jan. 3, 2008

(30) Foreign Application Priority Data
Jun. 16, 2006    (JP)    ............................ 2006-168121

(51) Int. Cl.
*G06F 13/00*    (2006.01)
(52) U.S. Cl. ............................... 710/33; 710/8; 710/11; 710/15; 710/17; 710/22; 710/23; 710/24; 710/25; 710/31; 710/39; 710/40; 710/100; 710/107; 710/113; 710/306; 710/307; 710/309; 710/313
(58) Field of Classification Search ..................... 710/5, 710/8, 11, 15, 17, 22, 23, 24, 25, 31, 33, 710/39, 40, 100, 107, 113, 306, 307, 309, 710/313
See application file for complete search history.

(56) References Cited

U.S. PATENT DOCUMENTS

| | | | |
|---|---|---|---|
| 5,553,268 A * | 9/1996 | Willenz et al. | 711/158 |
| 5,956,522 A * | 9/1999 | Bertone et al. | 710/52 |
| 6,230,219 B1 * | 5/2001 | Fields et al. | 710/22 |
| 6,338,119 B1 * | 1/2002 | Anderson et al. | 711/135 |
| 6,532,511 B1 * | 3/2003 | Brooks | 710/305 |
| 6,622,193 B1 * | 9/2003 | Avery | 710/263 |
| 6,636,919 B1 * | 10/2003 | Huth | 710/304 |
| 6,675,251 B1 | 1/2004 | Streitenberger et al. | 710/306 |
| 2005/0038946 A1 * | 2/2005 | Borden | 710/310 |
| 2007/0271405 A1 * | 11/2007 | Moore | 710/309 |

* cited by examiner

*Primary Examiner*—Tariq Hafiz
*Assistant Examiner*—Jasjit S Vidwan
(74) *Attorney, Agent, or Firm*—Fitzpatrick, Cella, Harper & Scinto

(57) ABSTRACT

There is provided a transfer apparatus having a bridge that transfers a transaction between a first and a second bus, and a data transfer unit that performs a data transfer by DMA between the first and second bus. The transfer apparatus controls a transfer sequence of transaction transfers by the bridge and data transfers by the data transfer unit, in which transaction transfers by the bridge are based on bus sequencing rules and data transfers by the data transfer unit are based on a data transfer activation condition.

11 Claims, 3 Drawing Sheets

TRANSFER APPARATUS AND METHOD

BACKGROUND OF THE INVENTION

1. Field of the Invention

The present invention relates to a transfer apparatus and a method that performs transaction transfers and data transfers by DMA between a first and a second bus.

2. Description of the Related Art

In a system that simultaneously actuates a DMA function and a bridge function with a PCI bridge, it is necessary to ensure a problem does not occur in the PCI transaction sequence. Conventionally, to achieve this, either the communication paths are consolidated in the bridge or, alternatively, protocols are separately provided for the bridge and the DMA to eliminate the dependency relation between the bridge function and the DMA function.

For instance, bridges have been disclosed that operate as a path A and a path B using two protocols (for example, see U.S. Pat. No. 6,675,251).

According to the disclosure in U.S. Pat. No. 6,675,251, since there is no relation between paths A and B even when path A is taken as a bridge and path B is taken as a DMA, the operations observe the sequences of the respective paths, and there is no relation between the operations of the bridge and the DMA.

In a case in which a bridge and a DMA are simply mounted on a single chip and transaction sequence control is performed by merely outputting in the input sequence, the following problem exists. There are some bridges in which the PCI sequencing rules allow a write transaction to pass out a read transaction. In this case, when a transaction is a read transaction, although a DMA that is equivalent to a write is allowed to pass out a read, the DMA is made to wait without passing out the read. Further, even in a case where a DMA transfer is enabled at an input bus, when an operating condition cannot be established at an output bus and the operation cannot be performed, a bridge transaction is made to wait.

In this case, the term "DMA operating condition" refers to acquisition of a DMA address (destination address) on the output bus side, and it is based on the premise of a system in which the DMA address of the output bus is set at the output bus.

In this connection, when setting the destination address of the output bus side on the input side, it is necessary to bind the degree of freedom of mapping of memory addresses at the output bus or to continuously notify a CPU or the like on the input bus of a valid address for DMA on the output bus.

There is also a method that incorporates a DMA address into the DMA from a descriptor of the output bus in order to establish a DMA transfer while retaining the degree of freedom of address mapping. According to that method, even if the DMA is enabled at the input bus, since it is not necessarily the case that a DMA address can be acquired at the output bus, the DMA operating condition is not established when the DMA address cannot be acquired, and a DMA wait state occurs.

SUMMARY OF THE INVENTION

The present invention realizes to improve performance for transaction transfers and data transfers by DMA that are performed between a first and a second bus.

According to one aspect of the present invention, there is provided a transfer apparatus comprising: a bridge unit adapted to transfer transactions between a first and a second bus; a data transfer unit adapted to perform a data transfer by DMA between the first and the second bus; and a sequence control unit adapted to control a transfer sequence of transaction transfers by the bridge unit and data transfers by the data transfer unit, in which the transaction transfers by the bridge unit are based on bus sequencing rules and the data transfers by the data transfer unit are based on a data transfer activation condition.

According to another aspect of the present invention, there is provided a transfer apparatus comprising: a transaction transfer unit adapted to transfer a transaction between a first and a second bus; a data transfer unit adapted to perform a data transfer by DMA between the first and the second bus; and an enable unit adapted to enable a write transaction when an activation condition that is imposed on a data transfer that is assigned a higher priority than the write transaction is not established.

Further features of the present invention will become apparent from the following description of exemplary embodiments (with reference to the attached drawings).

DESCRIPTION OF THE EMBODIMENTS

Figure 1:
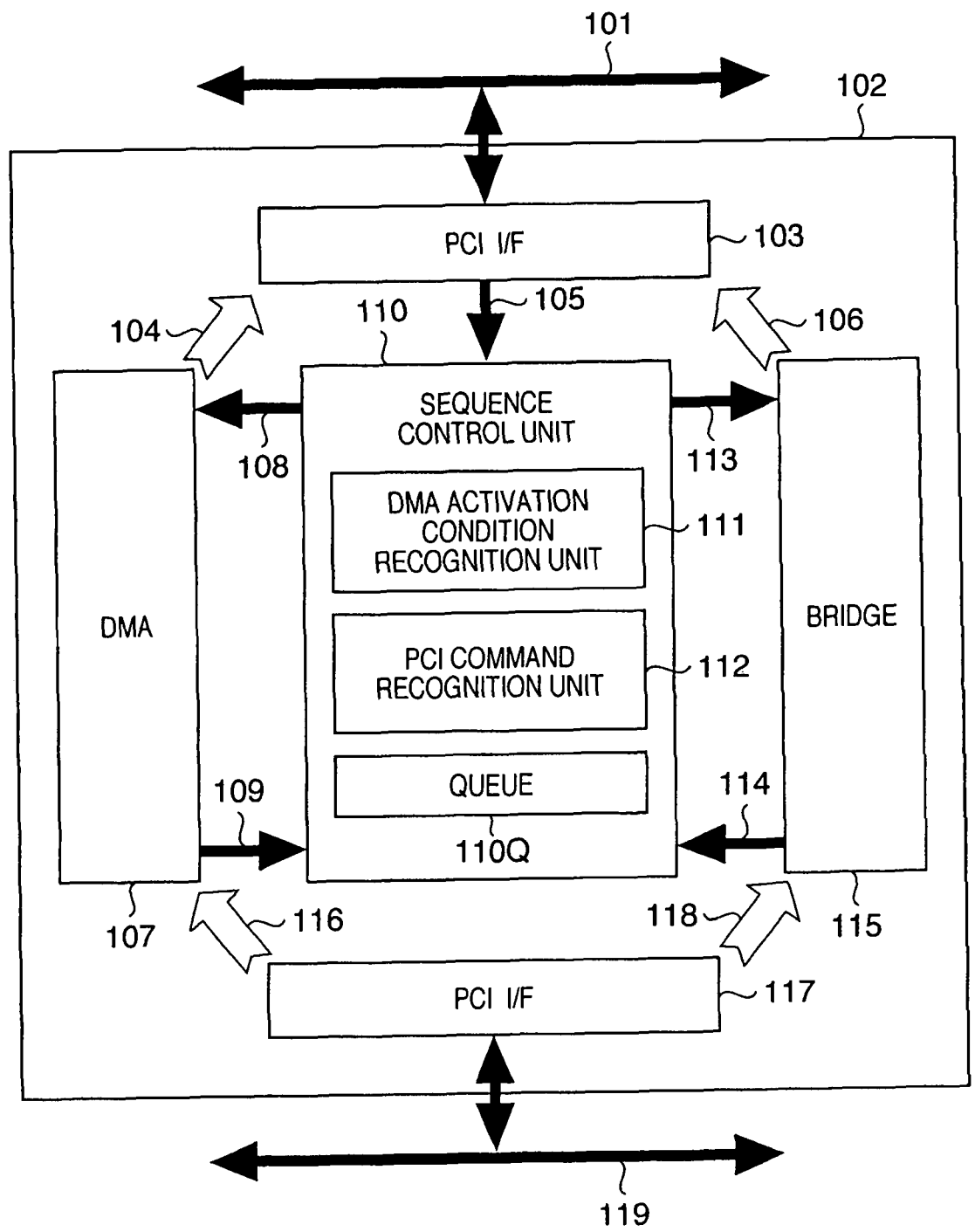
FIG. 1 is a view showing one example of the configuration of a data transfer apparatus according to one embodiment.

Hereunder, a preferred embodiment for implementing the invention is described in detail while referring to the drawings.

In this embodiment, when simultaneously operating a bridge and a DMA, the sequence of transfer operations of each is made to conform to PCI rules to eliminate unnecessary wait times.

FIG. 1 is a view showing one example of the configuration of a data transfer apparatus according to the present embodiment. In FIG. 1, reference numeral 101 denotes a first PCI bus and reference numeral 119 denotes a second PCI bus. Reference numeral 102 denotes a data transfer apparatus that operates on the basis of a sequence control method according to the present embodiment.

In the data transfer apparatus 102, reference numeral 103 denotes a PCI interface (I/F) unit. Reference numeral 104 denotes an internal bus that connects the PCI I/F unit 103 and a DMA unit 107 to be described later. Reference numeral 105 denotes an END signal. The END signal 105 is output from the PCI I/F unit 103 to a sequence control unit 110, described later, at the end of transfer of the first PCI bus 101. Reference numeral 106 denotes an internal bus that connects the PCI I/F unit 103 and a bridge 115 that is described later.

Reference numeral 107 denotes a DMA unit. The DMA unit 107 comprises a logic circuit for DMA transfer and a buffer that holds data at the time of a DMA transfer. Reference numeral 108 denotes a DMA transfer enable signal. The DMA transfer enable signal 108 is output to the DMA unit 107 from a sequence control unit 110, described later, to notify the DMA unit 107 that DMA transfer is enabled. Reference numeral 109 denotes a DMA transfer entry signal and a DMA activation condition signal. The DMA transfer entry signal is a signal that notifies the sequence control unit 110 that is described later to generate a DMA transfer with respect to the first PCI bus 101. The DMA activation condition signal is notified when data to be transferred to the PCI I/F unit 103 is defined.

Further, the DMA unit 107 processes data and DMA commands that are input from an internal bus 116, and transfers DMA data to an internal bus 104. The DMA unit 107 also performs recognition of a DMA enable signal 108 and generation of a DMA transfer entry signal 109 for managing a DMA transfer sequence at the sequence control unit 110 that is described later.

Reference numeral 110 denotes a sequence control unit. The sequence control unit 110 controls the issue sequence of DMA transfers and bridge transfers with respect to the first PCI bus 101. The sequence control unit 110 has an entry with a queue structure, and by assertion of a DMA entry transfer signal 109 or a bridge transfer entry signal 114 that is described later, a DMA transfer or a bridge transfer is registered in a queue 110Q.

In the sequence control unit 110, reference numeral 111 denotes a DMA activation condition recognition unit. The DMA activation condition recognition unit 111 recognizes whether or not a DMA transfer by the DMA unit 107 fulfills an activation condition on the first PCI bus 101. The activation condition is whether it has been possible to acquire a DMA address on the first PCI bus 101. The DMA address is acquired by a descriptor of the first PCI bus 101. Reference numeral 112 denotes a PCI command recognition unit. The PCI command recognition unit 112 identifies whether a transfer of a bridge that is described later is a read or a write transaction, and utilizes the result for an enable generation decision of the sequence control unit 110.

Reference numeral 113 denotes a bridge transfer enable signal. The bridge transfer enable signal 113 is output from the sequence control unit 110 to a bridge 115, described later, to notify the bridge 115 that a bridge transfer is enabled. Reference numeral 114 denotes a bridge transfer entry signal. The bridge transfer entry signal 114 notifies the sequence control unit 110 that a bridge transfer is to be executed. Reference numeral 115 denotes a bridge. Upon receiving a bridge transfer from a PCI I/F unit 117, the bridge 115 performs a bridge transfer to the PCI I/F unit 103.

The bridge 115 comprises a logic circuit that performs an address conversion when performing a bridge transfer, and a buffer for storing bridge transfer data. The bridge 115 also performs recognition of the bridge transfer enable signal 113 and generation of the bridge transfer entry signal 114 for managing the bridge transfer sequence at the sequence control unit 110.

Reference numeral 116 denotes an internal bus that connects the PCI I/F unit 117 and the DMA unit 107. Reference numeral 117 denotes a PCI I/F unit. The PCI I/F unit 117 performs input of a bridge transfer transaction from the second PCI bus 119. The PCI I/F unit 117 also performs input of data by a DMA operation and registry read/write for the setting and activation of a DMA operation of the DMA unit 107. Reference numeral 118 denotes an internal bus that connects the bridge 115 and the PCI I/F unit 117.

Further, the PCI I/F unit 103 performs a DMA transfer from the DMA unit 107 to the first PCI bus 101, and outputs an END signal 105 to the sequence control unit 110 when the transfer ends. The PCI I/F unit 103 also performs a bridge transfer from the bridge 115 to the first PCI bus 101, and outputs the END signal 105 to the sequence control unit 110 when the transfer ends.

The data transfer apparatus 102 has a configuration such that there is one set of configuration (however, not shown) that is the same as the configuration shown in FIG. 1 when the first PCI bus 101 and the second PCI bus 119 are viewed in the opposite manner.

Next, the entry reception processing of the sequence control unit 110 when performing a DMA transfer or a bridge transfer from the second PCI bus 119 to the first PCI bus 101 with the DMA unit 107 or the bridge 115 is described.

Figure 2:
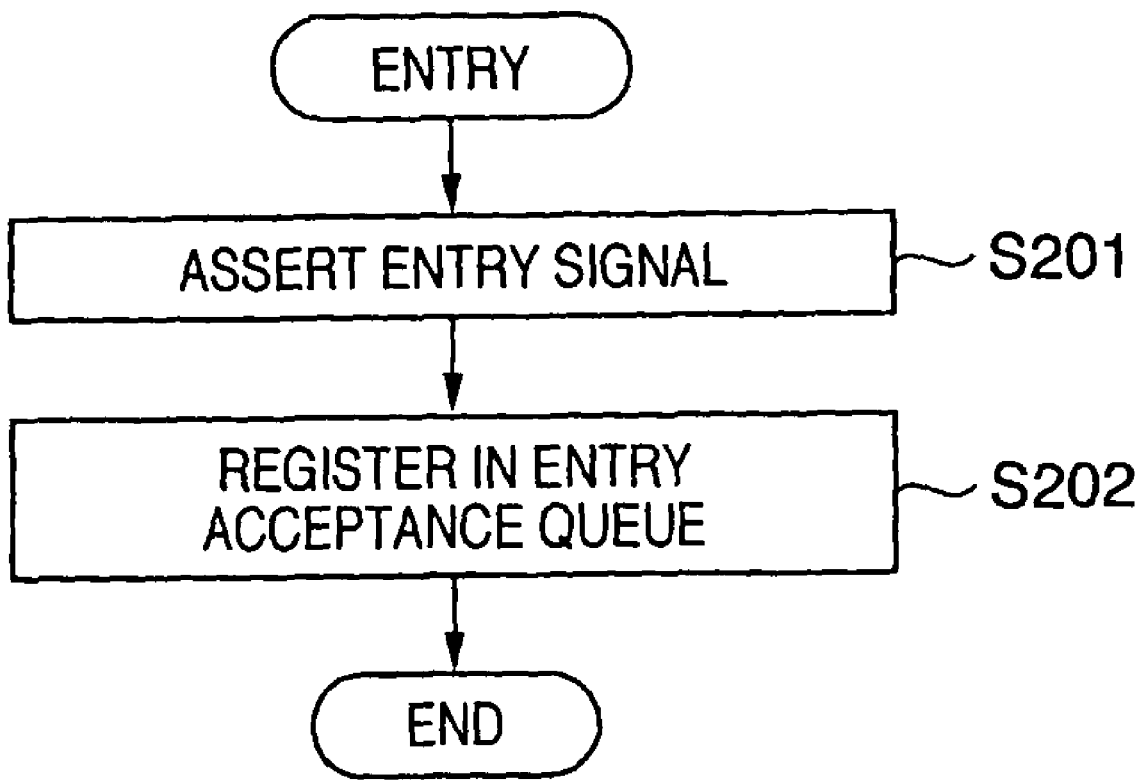
FIG. 2 is a flowchart illustrating entry reception processing at a sequence control unit 110.

FIG. 2 is a flowchart illustrating entry reception processing at the sequence control unit 110. First, upon the DMA unit 107 receiving a DMA activation command and data for transferring to the first PCI bus 101 from the second PCI bus 119 via the PCI I/F unit 117, the DMA unit 107 stores the data in a buffer of the DMA unit 107. Upon completing storage of the data, the DMA unit 107 asserts the DMA transfer entry signal 109 to the sequence control unit 110.

When the sequence control unit 110 recognizes the DMA transfer entry signal 109 that is asserted by the DMA unit 107 (S201), the sequence control unit 110 registers an entry in the internal queue 110Q (S202).

Further, when the sequence control unit 110 recognizes a bridge transfer entry signal 114 that is asserted by a PCI command from the bridge 115 in a similar manner to the DMA unit 107 (S201), the sequence control unit 110 registers an entry in the internal queue 110Q (S202).

Accordingly, regarding the entry reception processing at the sequence control unit 110, there is no difference with respect to the DMA unit 107 and the bridge 115.

Next, the processing when the sequence control unit 110 receives an entry from the DMA unit 107 or the bridge 115 and performs sequence control to generate an enable signal is described. In this case, the enable signal is a DMA enable signal or a PCI command read or write transaction enable signal.

Figure 3:
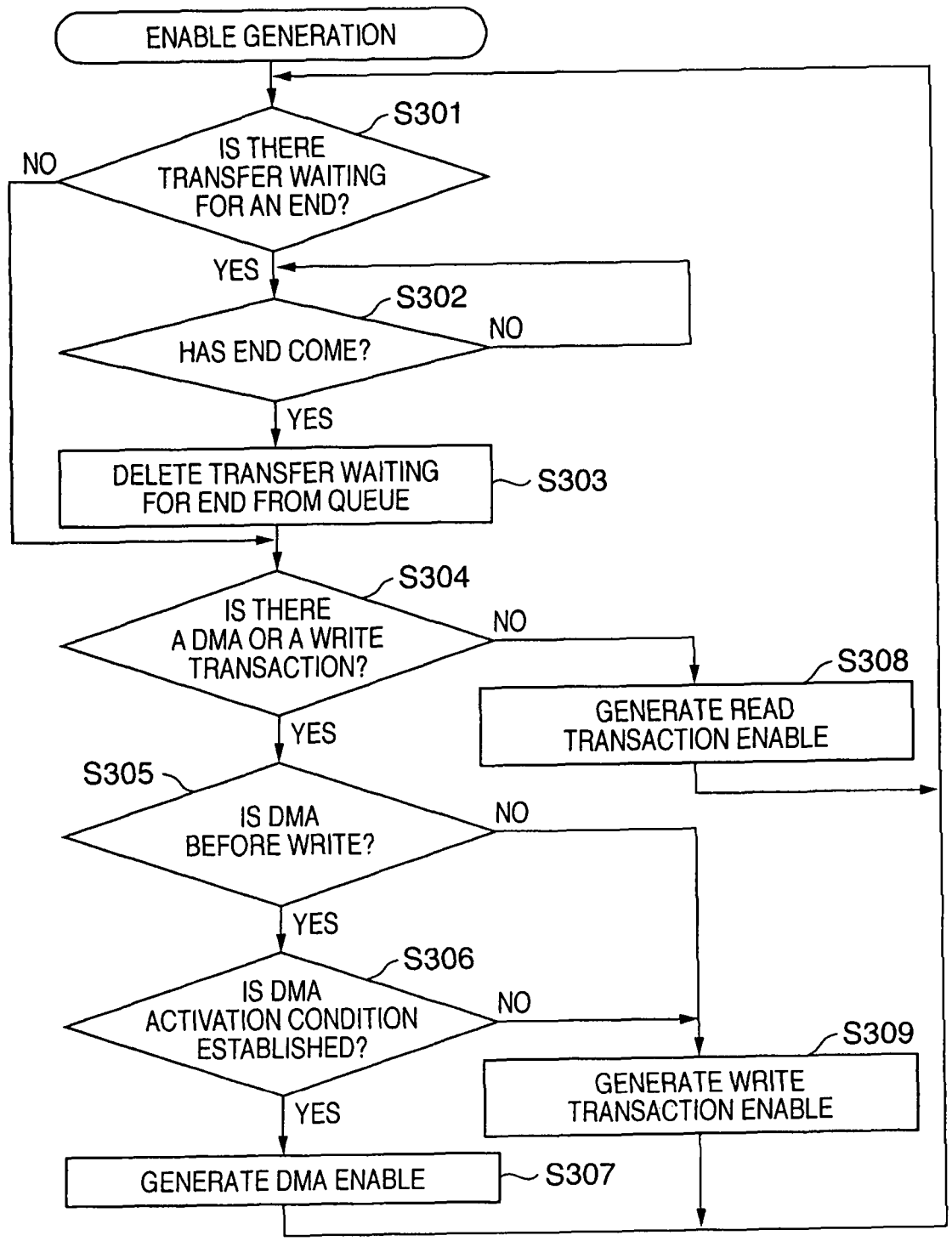
FIG. 3 is a flowchart illustrating sequence control processing at the sequence control unit 110.

FIG. 3 is a flowchart illustrating sequence control processing at the sequence control unit 110. First, the sequence control unit 110 checks whether or not there is a transfer waiting for an END based on the internal queue 110Q (S301). If the sequence control unit 110 determines as a result that there is no transfer waiting for an END, the sequence control unit 110 proceeds to step S304. If there is a transfer, the sequence control unit 110 waits until transfer is completed at the PCI I/F unit 103 and the END signal 105 is output (S302). Thereafter, when the END signal 105 is output (YES at S302), the sequence control unit 110 deletes the transfer that has been waiting for an END from the internal queue 110Q.

Next, the sequence control unit 110 checks whether or not there is a DMA or a write transaction in the internal queue 110Q (S304). When the sequence control unit 110 finds as a result that there is neither a DMA nor a write transaction (NO at S304), it generates an enable signal for a read transaction (S308) and returns to step S301.

When the sequence control unit 110 finds that there is a DMA or a write transaction (YES at S304), it checks the sequence in the internal queue 110Q to confirm whether a DMA is entered before a write transaction (S305). If the DMA is entered before the write transaction (YES at S305), the sequence control unit 110 checks whether or not the DMA activation condition is established (S306). In this case, the sequence control unit 110 checks whether or not the DMA activation condition is established at the DMA activation condition recognition unit 111 using the DMA transfer entry signal 109. If the sequence control unit 110 finds as a result that the DMA activation condition is established (YES at S306), it generates an enable signal for the DMA (S307) and returns to step S301. In this connection, the DMA activation condition is whether a DMA address could be acquired on the first PCI bus 101 that will be the output side of the DMA transfer or the like.

In contrast, when the write transaction comes before the DMA (NO at S305), the sequence control unit 110 generates an enable signal for the write transaction (S309) and returns to step S301.

As described above, since a write that can pass out a read is given precedence and is enabled by the processing of steps S304→S305→S309, a write transaction can be completed without waiting for a read transaction that is slow to complete. Thus, performance can be enhanced.

Further, the operation also proceeds to step S309 when the DMA activation condition is not established at step S306, so that a write transaction can pass out a DMA that is slow to complete. Thus, performance can be enhanced.

According to the present embodiment, the apparatus recognizes not only the transaction input order of a first bus and a second bus, but also whether a bridge transfer command is a read command or a write command. Alternatively, by checking a DMA activation condition such as the wait for defining a DMA address of a bus as the output side of a DMA transfer, a decline in performance due to a data or status delay can be prevented.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitutes the present invention.

Examples of the storage medium for supplying the program code include a floppy (registered trademark) disk, a hard disk, an optical disk, a magnetic-optical disk, a CD-ROM, a CD-R, a magnetic tape, a non-volatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-168121, filed Jun. 16, 2006, which is hereby incorporated by reference herein in its entirety.

What is claimed is:

1. A transfer apparatus, comprising:
   a first interface constructed to interface with a first bus;
   a second interface constructed to interface with a second bus;
   a bridge unit connected with said first interface via a first internal bus and with said second interface via a second internal bus and constructed to transfer a transaction between said first bus and said second bus;
   a data transfer unit connected with said first interface via a third internal bus and with said second interface via a fourth internal bus and constructed to perform a DMA data transfer between said first bus and said second bus; and
   a sequence control unit constructed to control an order in which the transaction transfer by said bridge unit and the DMA data transfer by said data transfer unit are enabled, such that a read transaction by said bridge unit is enabled when a write transaction and the DMA data transfer do not exist, such that the DMA data transfer is enabled when the DMA data transfer precedes the write transaction and a transfer destination of the DMA data transfer has been acquired, and such that the write transaction is enabled when the write transaction precedes the DMA data transfer or when the transfer destination of DMA data transfer is not acquired.

2. The apparatus according to claim 1, wherein the transfer destination of the DMA data transfer is acquired using a descriptor of said first bus.

3. The apparatus according to claim 1, wherein the first bus is a first PCI bus and the second bus is a second PCI bus, wherein said bridge unit comprises a PCI-PCI bridge unit constructed to transfer a transaction between the first PCI bus and the second PCI bus, and wherein said data transfer unit performs a data transfer by DMA between said first PCI bus and said second PCI bus.

4. A transfer apparatus comprising:
   a first interface constructed to interface with a first bus;
   a second interface constructed to interface with a second bus;
   a bridge connected with said first interface via a first internal bus and with said second interface via a second internal bus and constructed to transfer a transaction between said first bus and said second bus; and
   a data transfer unit connected with said first interface via a third internal bus and with said second interface via a fourth internal bus and constructed to perform a DMA data transfer between said first bus and said second bus; and
   a sequence control unit constructed to control an order in which the transaction transfer by said bridge and the DMA data transfer by said data transfer unit are enabled, such that a read transaction by said bridge is enabled when a write transaction and the DMA data transfer do not exist, such that the DMA data transfer is enabled when the DMA data transfer precedes the write transaction and a DMA data transfer activation condition is satisfied, and such that the write transaction is enabled when the write transaction precedes the DMA data transfer or when the DMA data transfer activation condition is not satisfied.

5. The apparatus according to claim 4, wherein the DMA data transfer activation condition is an acquisition of a transfer destination of the DMA data transfer.

6. The apparatus according to claim 4, wherein a transfer destination is acquired using a descriptor of said first bus.

7. A transfer apparatus, comprising:
a first interface constructed to interface with a first bus;
a second interface constructed to interface with a second bus;
a transaction transfer unit connected with said first interface via a first internal bus and with said second interface via a second internal bus and constructed to transfer a transaction between said first bus and said second bus;
a data transfer unit connected with said first interface via a third internal bus and with said second interface via a fourth internal bus and constructed to perform a DMA data transfer between said first bus and said second bus; and
an enable unit constructed to enable a write transaction when a DMA data transfer activation condition is not satisfied, and to enable a read transaction if no DMA data transfer is in a waiting state.

8. The apparatus according to claim 7, wherein the DMA data transfer activation condition is an acquisition of a transfer destination.

9. The apparatus according to claim 7, wherein said enable unit assigns a higher priority to the DMA data transfer than to the read transaction.

10. The apparatus according to claim 7, wherein the first bus is a first PCI bus and the second bus is a second PCI bus, wherein said bridge unit comprises a PCI-PCI bridge unit constructed to connect between the first PCI bus and the second PCI bus.

11. The apparatus according to claim 7, wherein the DMA data transfer is assigned a higher priority than the write transaction.

* * * * *